United States Patent
Engelhardt

(10) Patent No.: US 8,209,066 B2
(45) Date of Patent: Jun. 26, 2012

(54) ENVIRONMENTAL CONTROL SYSTEM FOR PRECISION AIRBORNE PAYLOADS

(75) Inventor: Michel Engelhardt, Woodbury, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 364 days.

(21) Appl. No.: 12/704,267

(22) Filed: Feb. 11, 2010

(65) Prior Publication Data

US 2011/0196540 A1 Aug. 11, 2011

(51) Int. Cl.
*G01C 23/00* (2006.01)

(52) U.S. Cl. .............. 701/3; 701/36; 236/13; 237/2 A; 237/12.3 A

(58) Field of Classification Search ............. 701/3, 36; 236/12.1, 12.11, 12.13, 13, 44 C, 44 E; 237/2 A, 237/12.3 A, 50; 244/118.5
See application file for complete search history.

(56) References Cited

U.S. PATENT DOCUMENTS

| | | | | |
|---|---|---|---|---|
| 3,913,833 | A * | 10/1975 | Minett et al. ............. | 236/49.3 |
| 4,419,926 | A * | 12/1983 | Cronin et al. ............. | 454/74 |
| 4,523,517 | A * | 6/1985 | Cronin ..................... | 454/74 |
| 4,623,969 | A | 11/1986 | Bensoussan et al. | |
| 4,656,835 | A | 4/1987 | Kidder et al. | |
| 4,814,579 | A * | 3/1989 | Mathis et al. ............. | 219/202 |
| 5,873,256 | A * | 2/1999 | Denniston ................. | 62/91 |
| 5,918,472 | A | 7/1999 | Jonqueres | |
| 6,019,822 | A | 2/2000 | Kanzawa et al. | |
| 6,058,715 | A | 5/2000 | Strang et al. | |
| 6,427,471 | B1 | 8/2002 | Ando et al. | |
| 6,440,317 | B1 | 8/2002 | Koethe | |
| 6,481,222 | B1 * | 11/2002 | Denniston ................. | 62/94 |
| 6,851,459 | B2 | 2/2005 | Squirrell et al. | |
| 7,264,649 | B1 | 9/2007 | Johnson et al. | |
| 7,305,842 | B1 | 12/2007 | Schiff | |
| 7,381,235 | B2 | 6/2008 | Koene et al. | |
| 7,594,941 | B2 | 9/2009 | Zheng et al. | |
| 2003/0191561 | A1 | 10/2003 | Vos | |
| 2004/0194371 | A1 | 10/2004 | Kinnis | |
| 2006/0059942 | A1 | 3/2006 | McAuliffe et al. | |
| 2007/0012060 | A1 | 1/2007 | Simons | |
| 2008/0022688 | A1 | 1/2008 | Decrisantis et al. | |
| 2008/0121103 | A1 | 5/2008 | Boyle et al. | |
| 2008/0199326 | A1 | 8/2008 | Masoudipour et al. | |
| 2008/0283663 | A1 * | 11/2008 | Space et al. .............. | 244/118.5 |
| 2009/0084122 | A1 * | 4/2009 | Casado Montero ...... | 62/244 |
| 2009/0314161 | A1 | 12/2009 | Al-Alusi et al. | |

FOREIGN PATENT DOCUMENTS

WO   WO2007054206 A1   5/2007

* cited by examiner

*Primary Examiner* — David H Bollinger
(74) *Attorney, Agent, or Firm* — Leo Zucker

(57) ABSTRACT

Outside air enters a ram air scoop on an aircraft frame, and is ducted to a ram air control valve. The air control valve outputs a desired air mass flow to a cyclone air-water separator which removes moisture and produces a dry air flow. A heater assembly heats the dry air to a desired temperature and directs the heated air into an equipment bay enclosure on the aircraft. The relative humidity of the heated air is sensed by an air moisture sensor which produces a corresponding signal. Other sensors disposed near a payload in the bay enclosure produce corresponding air temperature and air pressure signals. All the sensor signals are input to a processor or controller configured to activate the air control valve and the heater assembly according to set points for temperature and humidity that are specified for the payload in the bay enclosure.

19 Claims, 3 Drawing Sheets

Figure 1:
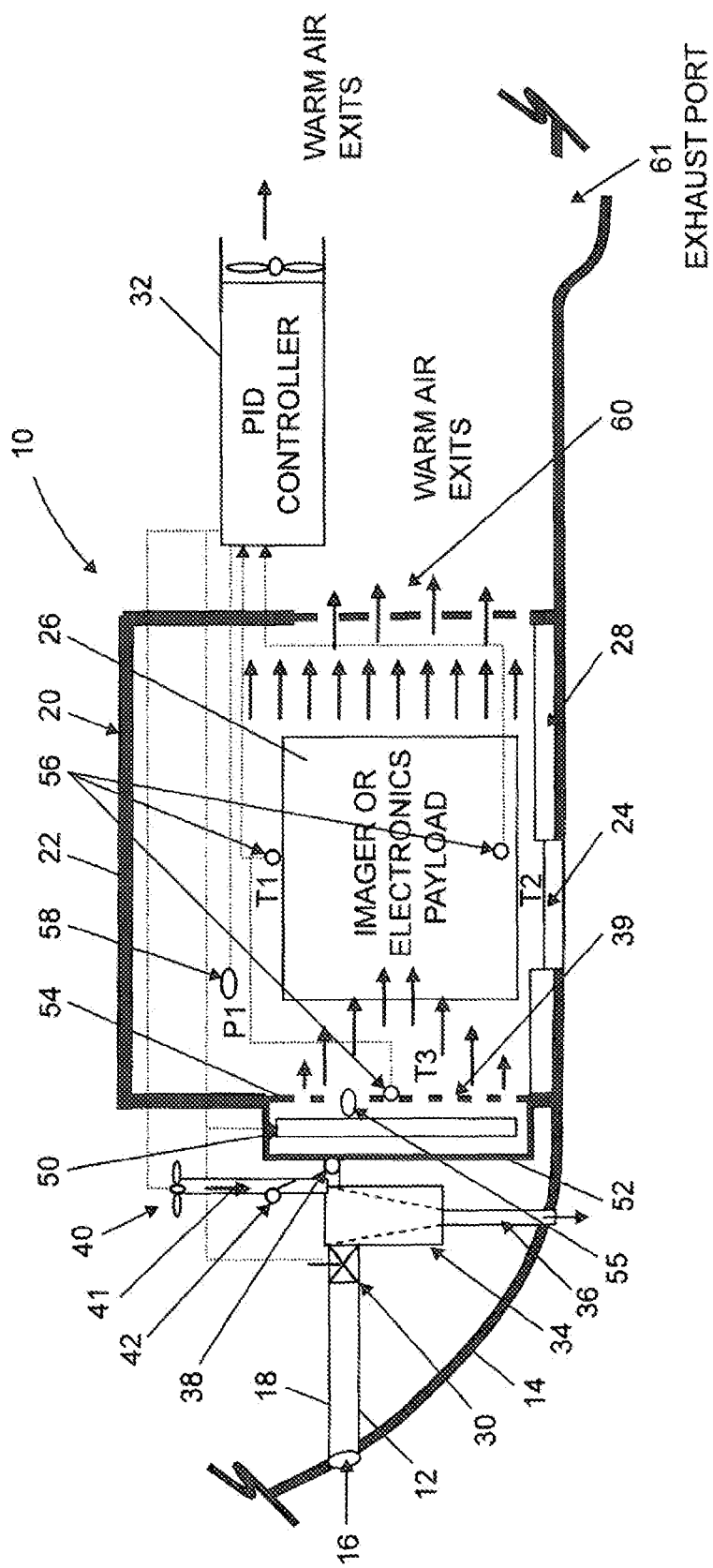

|  | RAM AIR CONTROL VALVE 30 | AIR HEATER 50 | AIR CIRCULATION FAN 40 | CHECK VALVE 42 | DESICCANT 38 |
|---|---|---|---|---|---|
| GROUND OPERATION | CLOSED <40C; OPEN TO GROUND COOLING CART >40C | ON <10C; OFF >10C | ON | OPEN | CHECK INDICATOR |
| TAKE-OFF | CLOSED | ON <10C; OFF >10C | ON | OPEN | |
| ASCEND TO 20 KFT | CLOSED | ON <10C; OFF >10C | ON | OPEN | |
| AT 20 KFT | CONTROLLED | CONTROLLED TO KEEP PAYLOAD AT 10C TO 40C | OFF | CLOSED | |
| DESCEND TO SL | ORIFICED | ON | ON | OPEN | |
| LAND | CLOSED | ON FOR 20 MIN | ON FOR 20 MIN | OPEN | CHECK INDICATOR |

FIG. 3

ENVIRONMENTAL CONTROL SYSTEM FOR PRECISION AIRBORNE PAYLOADS

BACKGROUND OF THE INVENTION

1. Field of the Invention

The present invention relates to environmental control systems, and particularly to systems that provide controlled temperature and humidity environments for airborne payloads.

2. Discussion of the Known Art

Airborne reconnaissance, surveillance, and electronics payloads are typically mounted in an unpressurized equipment bay on an aircraft, and are expected to operate reliably at altitudes from sea level to 60,000 feet or higher above mean sea level. Such payloads often include precision optics, focal plane arrays, and electronics. The electronic equipment may include recorders, data links, sensor control units, control electronics units, and countermeasures systems.

The performance of optical system components is affected greatly by thermal expansion and contraction. Additionally, opto-mechanical and electronic components that are integrated within precision optical systems are also sensitive to temperature and moisture. Thus, in order for precision optical system payloads to operate properly and accurately over a given aircraft mission flight profile, the temperature and the humidity inside the equipment bay must be controlled according to the specifications imposed by the system payloads. The temperature requirements are typically 25 deg. C.+/−2 deg. C., without condensation developing inside the bay throughout the mission flight profile. Depending on the application, the internal equipment bay temperature specification can range between −30 deg. C. to 40 deg. C., with a set temperature within this band controlled to a tolerance of +/−5 deg. C. to +/−1 deg. C. throughout the flight profile.

At present, either an air cycle machine (ACM) or a vapor cycle machine (VCM) and associated fans are used for thermal control of electronics and imaging systems aboard aircraft. Airborne ACM systems are disclosed, for example, in U.S. Pat. No. 6,058,715 (May 9, 2000) and U.S. Pat. No. 6,427,471 (Aug. 6, 2002), and in U.S. Patent Application Pubs. No. 2006/0059942 (Mar. 23, 2006) and No. 2008/0022688 (Jan. 31, 2008). Airborne VCM systems are described, e.g., in U.S. Pat. No. 5,918,472 (Jul. 6, 1999), and in U.S. Patent Application Pub. No. 2008/0199326 (Aug. 21, 2008). Disadvantages of either system are that the ACM and the VCM machines each weigh approximately 100 pounds and consume a large amount of electrical power and critical volume aboard an aircraft. Also, the cost of either system typically exceeds $100,000, with a mean-time-between-failures (MTBF) of only about 4,000 flight-hours.

Cyclone separators that remove dust, liquid, and other matter from a supply of air are generally known. Cyclone separators operate by directing the supplied air to flow in a conical path, thereby causing matter carried or entrained within the air to separate from the air by centrifugal force. A cyclone separator for dehumidifying compressed air for marine control equipment is disclosed in U.S. Pat. No. 6,019,822 (Feb. 1, 2000) which is incorporated by reference. See also, U.S. Pat. No. 6,851,459 (Feb. 8, 2005); U.S. Pat. No. 7,381,235 (Jun. 3, 2008); and U.S. Pat. No. 7,594,941 (Sep. 29, 2009), all of which are also incorporated by reference. As far as is known, however, cyclone separators have not been used in systems for controlling the thermal environment of sensitive airborne payloads.

Accordingly, there is a need for a reliable and light weight environmental control system for sensitive airborne payloads, particularly a system that consumes minimal space and electrical power aboard an aircraft, and which can be constructed and maintained at relatively low cost.

SUMMARY OF THE INVENTION

According to the invention, an environmental control system for a payload equipment bay enclosure on an aircraft includes a ram air scoop arranged with an opening in the forward direction of the aircraft for obtaining a supply of outside air. An air control valve receives the outside air supply from the scoop and provides a determined air mass flow in response to an air control valve signal. A cyclone air-water separator has an inlet for receiving the air mass flow from the air control valve, and the separator operates to remove moisture and to provide a relatively dry air mass flow at an outlet of the separator.

An air heater assembly has a heater intake in communication with the outlet of the separator for heating the relatively dry air mass flow to a determined temperature in response to a heater signal, and for directing the temperature controlled air mass flow toward the equipment bay enclosure. Prior to entering the enclosure, the relatively dry air preferably passes through a regenerative desiccant to remove further any humidity entrained in the air flow. An air moisture sensor and a temperature sensor are each disposed in a path of the temperature controlled air mass flow from the heater assembly, for producing signals corresponding to relative humidity and temperature of the air mass flow. One or more air temperature sensors are also disposed in the bay enclosure in the region of a payload when mounted in the enclosure for producing corresponding air temperature signals, and an air pressure sensor is disposed in the enclosure to produce a signal corresponding to altitude of the payload.

A processor or controller has inputs coupled to the air temperature sensors and to the air pressure sensors. The controller is configured to supply the air control valve signal and the heater signal according to certain humidity and temperature set points required for the payload in the equipment bay enclosure. Accordingly, the inventive control system enables reliable temperature and humidity control in unpressurized equipment bays at altitudes of up to 60,000 feet or higher.

For a better understanding of the invention, reference is made to the following description taken in conjunction with the accompanying drawing and the appended claims.

BRIEF DESCRIPTION OF THE DRAWING

In the drawing:

FIG. 1 is a diagram of an environmental control system according to the invention;

FIG. 2 is a schematic diagram of the inventive control system including a controller shown in FIG. 1: and FIG. 3 is a table showing a controlled state of certain components in the system of FIG. 1 over part of a typical aircraft mission flight profile.

DETAILED DESCRIPTION OF THE INVENTION

FIG. 1 is a diagram of an environmental control system 10 according to the invention. The system 10 maintains the temperature and relative humidity environment necessary for reliable and accurate operation of sensitive reconnaissance, surveillance, and electronics payloads on high performance aircraft, unmanned aerial vehicles (UAVs), blimps, and other platforms used for reconnaissance, surveillance or monitoring. As used herein, the term “aircraft” includes all such vehicles and platforms.

In the illustrated embodiment, the system 10 includes a ram air scoop 12 that is fixed on an aircraft frame 14 with an open front end 16 of the scoop facing in a forward direction of the aircraft. During flight, outside air that enters the open end 16 of the scoop is directed through an intake duct 18 to be conditioned and supplied to the interior of an equipment bay enclosure 20 on the aircraft. The bay enclosure 20 is preferably thermally insulated from the surrounding environment in the aircraft by a shroud 22 of fiberglass or equivalent material having low thermal conductivity. A window 24 formed in the aircraft frame 14 allows outside light or other radiation to enter the equipment bay enclosure 20 for imaging or other processing by a payload 26 when mounted inside the enclosure 20. Additional insulation 28 is preferably disposed around the window 24 between the aircraft frame 14 and the bay enclosure 20. The payload 26 may include, for example, sensitive reconnaissance, surveillance, and/or electronics systems whose reliability and accuracy would be compromised if the air temperature or humidity inside the equipment bay enclosure 20 deviates from specified limits. The payload 26 may, or may not, have its own separate enclosure.

A ram air control valve 30 has an inlet for receiving the outside air supplied through the duct 18 from the ram air scoop 16. The control valve 30 operates to provide a determined air mass flow at an outlet of the valve in response to a signal from a controller 32 throughout the aircraft's Mach number and altitude, coupled with transient aerodynamic heating from the aircraft power flight condition and the payload's own heat dissipation which depends on its transient modes-of-operation. A suitable ram air control valve is described, e.g., in International Patent Application PCT/EP2006/010289 titled Emergency Ram Air Inlet Valve of an Aircraft, published May 18, 2007, as WO/2007/054206 and which is incorporated herein by reference.

The controlled air mass flow from the outlet of the control valve 30 is directed to an inlet of a cyclone air-water separator 34 that is constructed and arranged to remove moisture and to produce a corresponding dry air mass flow at an outlet of the separator. The air-water separator 34 may be selected from among commercially available separators, for example, the "Cyclonic Mist Eliminator" manufactured by Bisco Enterprise, Inc. of Addison, Ill., USA. Any liquid condensate is dumped overboard through a water drain line and exit port 36. Such condensate is likely to be produced at altitudes below 20,000 feet where the humidity ratio is typically high. The dry air mass flow from the separator 34 is preferably directed through a desiccant and filter 38 arranged at or near the outlet of the separator to lower the relative humidity (RH) of the air further, and to remove any remaining particulates and entrained moisture before the air is directed to enter the equipment bay enclosure 20.

In the embodiment illustrated in FIG. 1, an air circulation fan 40 is incorporated for recirculating air that exits from ports 60 provided in the equipment bay enclosure 20, in response to a signal from the controller 32. When activated, the fan 40 directs warm air that exits the enclosure 20 from the ports 60, through a duct 41 and a check valve 42. The check valve 42 operates to block the flow of dry air at the outlet of the separator 34 from entering the duct 41 when the ram air valve 30 is throttled open. Downstream from the air circulation fan 40, the duct 41 is preferably formed and arranged to open into the outlet of the cyclone separator 34 so that the flow of recirculated air in the duct 41 enters the separator outlet at an angle of approximately 15 degrees with respect to the direction of flow of the dried air from the separator 34, thus becoming entrained with the dried air.

An air heater assembly 50 has a heater intake 52 in communication with the outlet of the separator 34, and a heater exhaust manifold 54 that opens into the equipment bay enclosure 20. The air heater assembly 50 is constructed and arranged to heat the dry air mass flow from the separator 34 to a desired temperature for the payload 26 in response to a signal from the controller 32, and to direct the temperature controlled air flow (the enthalpy) into the thermally insulated enclosure 20 through the manifold 54. Instead of being disposed at or near the outlet of the cyclone separator 34, the desiccant 38 may be disposed in the vicinity of an outlet on the heater exhaust manifold 54.

A relative humidity sensor 55 is disposed in a path of the heated air mass flow from the air heater assembly 50, for example, inside the exhaust manifold 54. The sensor 55 produces an air moisture signal that corresponds to the relative humidity of the heated air mass flow.

One or more temperature sensors 56 are disposed inside the equipment bay enclosure 20 in the region of the payload 26, and the sensors 56 operate to produce corresponding air temperature signals. In the embodiment illustrated in FIG. 1, temperature sensors 56 labeled T1 and T2 are placed at the top and the bottom of the payload 26 (labeled Imager or Electronics in the drawing) to determine the air temperatures above and below the payload. A third temperature sensor 56 labeled T3 may be co-located with the humidity sensor 55. If the difference between the temperatures indicated by sensors T1 and T2 is more than, e.g., 0.5 deg. C., then the openings of the inlet ports 39 on the equipment bay 20 may be adjusted by operation of the controller 32 until the temperature difference is within acceptable limits, typically determined during laboratory assembly. Otherwise, during flight, the outputs of the temperature sensors 56 are averaged by the controller 32. Also, an air pressure sensor 58 is disposed in the equipment bay 20 in the region of the payload 26 to produce a corresponding air pressure signal. All of the sensors 55, 56 and 58 may be selected from among units that are presently commercially available.

The signals produced by the air moisture sensor 55, the temperature sensors 56 and the air pressure sensor 58, are input to the controller 32. The controller 32 is configured and arranged to supply the signals that activate the ram air control valve 30, the heater assembly 50, the equipment bay inlet ports 39 and the air circulation fan 40, so that the temperature and the humidity of the air inside the equipment bay enclosure 20 is conditioned according to desired set points that are entered in the controller 32. As mentioned, upon exiting the enclosure 20 through the ports 60, conditioned warm air is preferably returned in a closed loop fashion to mix with the dried air from the separator 34. Alternatively, all the air exiting from the ports 60 may be dumped overboard. If the pressure of air surrounding the bay enclosure 20 reaches a level that prevents outside air from the ram air valve 30 from entering the enclosure, an exhaust port 61 may be provided on the aircraft frame 14 to vent the surrounding air.

In the FIG. 1 embodiment, during the end of a mission and while descending, the ram air valve 30 is preferably kept shut while the air circulation fan 40 is activated to recirculate air exiting from the equipment bay enclosure 20 with the heater assembly 50 is turned on. This descent mode-of-operation allows the payload 26 to warm-up while external humid air enters the bay as the bay becomes re-pressurized. In response to a signal from the controller 32, the fan 40 directs warm air exiting from the enclosure 20 through the duct 41 and the check valve 42. As mentioned, the check valve 42 operates to block the flow of dry air from the outlet of the separator 34 from entering the duct 41 when the ram air valve 30 is throttled open.

In an alternate control scheme, during short duration low altitude penetrations at high Mach number where external aerodynamic boundary layer air exceeds the air temperature control limit of the internal payload 26, the ram air valve 30 is temporarily shut and the air circulation fan 40 is turned ON. In this alternate scheme, air leaving the equipment bay enclosure 20 is either returned (by entrainment) in closed loop fashion to mix with the incoming ram air, or the air is dumped overboard.

Figure 2:
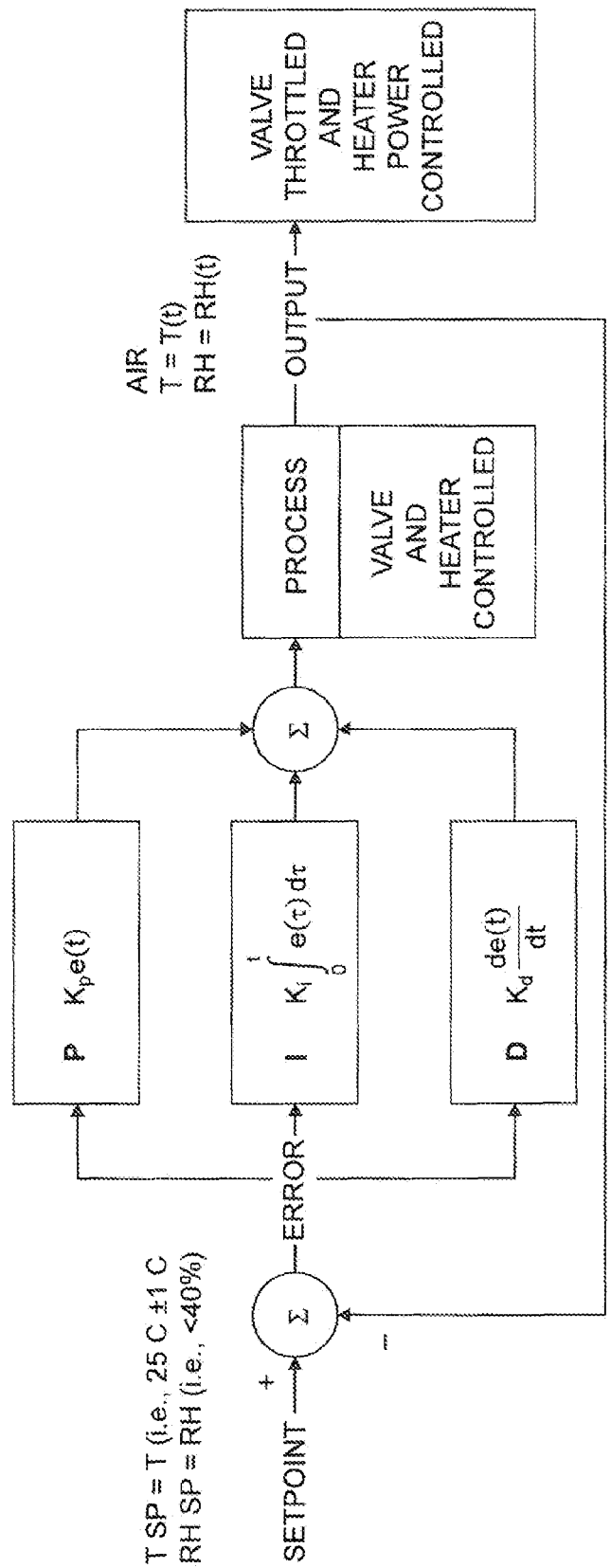

FIG. 2 is a control diagram of the environmental control system 10 in FIG. 1 including the controller 32. The controller 32 is preferably a commercially available proportional-integral-differential (PID) type of processor or controller, for example, a West 8100 Process Control available from ISE, Inc. of Cleveland, Ohio, USA. Other available controllers or processors may also be used, including a basic ON/OFF type controller with hysteresis. Separate set points (SP) are entered in the controller 32 for temperature T (for example, T SP=25 deg. C.+/−1 deg. C.); and for relative humidity RH (e.g., RH SP=<40%). The set points are arbitrary and preferably can be changed depending on the desired control.

The temperature and the humidity inside the equipment bay enclosure 20 are sensed continuously or at regular intervals over time by the controller 32 as required, and the sensed values are subtracted from their respective set points to generate corresponding error signals e(t). In the preferred embodiment, the controller 32 operates in a known manner to produce a proportional (P) error term $K_p\, e(t)$, an integral (I) error term $K_i \int_{(0 \to t)} e(t)dt$, and a differential (D) error term $K_d\, de(t)/dt$. As illustrated in FIG. 2, the three error terms for each set point are summed (at Σ), and the controller 32 outputs corresponding signals to the heater assembly 50 and the air control valve 30 to reduce any resulting differences between the temperature and the humidity sensed in the bay enclosure 20 and the corresponding set points.

Those skilled in the art will understand that the proportional gain term $K_p$ will effect a change that is proportional to a currently determined error value. The controller 32 functions as a double processor that controls humidity and temperature simultaneously to ensure that no condensation will form in the equipment bay enclosure 20. When added to the proportional term $K_p$, the integral gain term $K_i$ accelerates the movement of the process toward the set point, and eliminates any residual steady state error that may occur when using a proportional only type of controller. The differential gain $K_d$ slows the rate of change of the controller output, and its effect is most noticeable close to the controller's set point. Actual values for the gain terms $K_p$, $K_i$ and $K_d$ may also be determined by persons skilled in the art.

The interaction of the three gain terms as well as the simultaneous control of temperature and humidity is determined by the controller 32. The controller settings for the temperature and humidity are aircraft mode-of-operation dependent. During aircraft ground operation, take-off, climb, mission operation, and descent/landing, the controller 32 operates to set the required temperature and humidity conditions for the payload 26 inside the equipment bay enclosure 20.

An example of an algorithm that may be coded in the controller 32 to throttle the air control valve 30 and to activate the heater assembly 50 to meet the temperature and the humidity set points, is given below.

| PID Controller Algorithm |
| --- |
| set point |
| start |
| temperature |
| relative humidity |
| actual position = temperature |
| actual position = relative humidity |
| previous error = error or 0 if undefined |
| error = set point − actual position |
| P = Kp * error |
| I = I + Ki * error * dt |
| D = Kd * (error − previous error) / dt |
| sum = P + I + D |
| If (sum < set point, open valve, close valve) |
| If (sum < set point, increase heat, decrease heat) |
| t + dt |
| goto start |

EXAMPLE

The following is an example of the operation of the inventive system 10 to achieve environmental control between 10 deg. C. and 40 deg. C. inside the bay enclosure 20 over the course of an aircraft mission. The table in FIG. 3 illustrates the system operation over those portions of the mission between ground operation, take-off, ascent to an altitude of 20,000 feet (20 kft) or higher, and descent from 20 kft.

During ground operation, the ram air control valve 30 is opened to allow a ground cooling cart to provide conditioned air into the equipment bay 20. With the ground cooling cart connected, the environment inside the bay enclosure 20 is conditioned to a desired temperature and relative humidity. The air heater assembly 50 is preferably turned ON if the bay temperature sensors 56 indicate a temperature of less than 10 deg. C., and the heater assembly is turned OFF when the air temperature is above 10 deg. C. (or 15 deg. C. if a 5 deg. C. hysteresis is desired).

Also, during ground operation, the flight maintenance operator checks an indicator for the desiccant 38 to ensure that it is blue. If the desiccant indicator is red, then the desiccant 38 is changed. A typical desiccant is "Dessicite 25" available from Engelhard Corporation. When the aircraft is ready to taxi down the runway prior to take-off, the ground cooling cart is disconnected. Once the ground cooling cart is disconnected, the air circulation fan 40 is turned ON and the check valve 42 is set open.

As shown in FIG. 3, during take-off and ascent to a nominal altitude of 20 kft, the controller 32 operates to keep the ram air valve 30 closed to prevent a large amount of wet air from entering the environmental control system 10. This action prevents the system 10 from being over-saturated and ensures longer desiccant life. The air heater assembly 50 is activated by the controller 32 to obtain the desired temperature in the equipment bay enclosure 20, and the air circulation fan 40 is ON forcing the check valve 42 to stay open. Once above 20 kft, the relative humidity in the atmosphere typically becomes negligible.

When the aircraft reaches a nominal altitude of 20 kft, the controller 32 is operative to open the ram air valve 30, and to turn the air circulation fan 40 OFF. In addition, the heater assembly 50 is turned ON to control air temperature inside the equipment bay enclosure 20 to the specified temperature for the payload 26. The air exiting from the enclosure 20 is either allowed to recirculate by operation of the fan 40 and entrainment with the pressurized dry air flow at the outlet of the separator 34, or the air is dumped overboard when the fan 40 is powered OFF. If prior to the end of the mission the aircraft dives below 20 kft into a humid atmosphere before ascending again to a higher altitude, then the ram air valve 30 may remain open and the humid air will be dried by operation of the cyclone separator 34. Any remaining entrained moisture in the air (the cyclone separator 34 may be about 90% efficient) is absorbed by the desiccant 38.

Once the mission is over and the aircraft descends below 20 kft, the ram air valve 30 is closed. The fan 40 is turned ON and the air recirculation loop provides heating to the interior of the equipment bay enclosure 20 to ensure that the air temperature surrounding the payload 26 is above an environmental dew point of, e.g., 33 deg. C. (not exceeding 35 deg. C.).

As disclosed herein, the inventive environmental control system 10 replaces air cycle and the vapor cycle systems commonly used on aircraft to provide environmental control for sensitive payloads. The system 10 creates new value for users by providing the following advantages:

1. Lowering airborne volume consumed for payload thermal management by at least ten cubic feet;
2. Lowering the total aircraft payload weight by at least 80 pounds;
3. Lowering the power draw required from the airborne platform by more than 2 KW;
4. Increasing the mean time between system failures by a factor of over 70;
5. Substantially lowering the cost of a thermal management system for the payloads;
6. Reducing the time required for life cycle system design, integration, and testing by as much as 40%; and
7. Allowing the user to select most if not all of the major components of the system 10 from among commercial off-the-shelf (COTS) products.

While certain embodiments of the invention have been disclosed herein, it will be understood by those skilled in the art that various modifications and changes may be made without departing from the spirit and scope of the invention. Accordingly, the invention includes all such modifications and changes that lie within the scope of the following claims.

I claim:

1. An environmental control system for a payload equipment bay enclosure on an aircraft, comprising:
    a ram air scoop arranged to open in a forward direction of the aircraft for obtaining a supply of outside air;
    an air control valve constructed and arranged for receiving the outside air supply from the scoop, and for providing a determined air mass flow in response to an air control valve signal;
    a cyclone air-water separator constructed and arranged for receiving the air mass flow from the air control valve, and for removing moisture to provide a dry air mass flow from an outlet of the separator;
    an air heater assembly constructed and arranged for heating the dry air mass flow from the separator to a determined temperature in response to a heater signal, and for directing the heated air mass flow from an outlet of the heater assembly toward the equipment bay enclosure;
    an air moisture sensor disposed in a path of the heated air mass flow from the heater assembly for producing an air moisture signal corresponding to a relative humidity of the heated air mass flow;
    a first air temperature sensor disposed in the equipment bay enclosure in the region of a payload when mounted in the enclosure, for producing corresponding air temperature signals;
    an air pressure sensor disposed in the equipment bay enclosure in the region of the payload for producing a signal corresponding to an altitude of the payload; and
    a processor or controller having inputs coupled to the air moisture sensor, the first air temperature sensor and the air pressure sensor, wherein the controller is configured and arranged to supply the air control valve signal and the heater signal according to desired set points for temperature and humidity for the payload inside the equipment bay enclosure.

2. An environmental control system according to claim 1, wherein the controller is a proportional-integral-differential (PID) type of controller.

3. An environmental control system according to claim 1, including an air circulation fan and a duct arranged for recirculating air that exits from the equipment bay enclosure through the duct so that the recirculated air mixes with the dry air from the separator in response to a signal from the controller.

4. The system of claim 3, including a check valve arranged in the duct to block the dry air from the separator from entering the duct.

5. An environmental control system according to claim 1, including a desiccant arranged at or near the outlet of the cyclone separator for lowering the relative humidity of the air mass flow from the separator further prior to entering the equipment bay enclosure.

6. An environmental control system according to claim 1, including a desiccant arranged in the vicinity of the outlet of the air heater assembly for lowering the relative humidity of the heated air from the heater assembly further prior to entering the equipment bay enclosure.

7. An environmental control system according to claim 1, including a filter arranged at or near an outlet of the separator for removing particulates in the air mass flow from the separator.

8. An environmental control system according to claim 1, including an air circulation fan arranged for recirculating air exiting from the equipment bay enclosure in response to a signal from the controller.

9. A system according to claim 8, including a duct arranged for receiving the recirculated air from the air circulation fan, wherein a downstream end of the duct is formed and arranged to open into the outlet of the cyclone separator so that recirculated air in the duct is entrained with the air mass flow provided at the outlet of the separator.

10. A system according to claim 9, wherein the downstream end of the duct is formed so that a flow of recirculated air in the duct enters the outlet of the cyclone separator at an angle of approximately 15 degrees with respect to the direction of the air mass flow provided at the outlet of the separator.

11. A system according to claim 9, including a check valve arranged in the vicinity of the downstream end of the duct for blocking a flow of dried air at the outlet of the cyclone separator from entering the duct.

12. An environmental control system according to claim 8, wherein the controller is configured to maintain the air circulation fan in an on state from take-off and during ascent to an altitude of approximately 20,000 feet during the course of an aircraft mission profile.

13. An environmental control system according to claim 12, wherein the controller is configured to open the air control valve and to set the air circulation fan to an OFF state at said altitude.

14. An environmental control system according to claim 12, wherein the controller is configured to control the heater assembly at and above said altitude so that the air temperature inside the equipment bay enclosure is controlled according to the desired setpoint for temperature for the payload.

15. An environmental control system according to claim 12, wherein the controller is configured to control the air control valve at and above said altitude so that the relative humidity inside the equipment bay enclosure is controlled according to the desired setpoint for humidity for the payload.

16. An environmental control system according to claim 12, wherein the controller is configured to control the heater assembly and the air control valve at an altitude of approximately 60,000 feet.

17. An environmental control system according to claim 1, wherein the controller is configured to maintain the air control valve in a closed state from take-off and during ascent to an altitude of approximately 20,000 feet during the course of an aircraft mission profile.

18. An environmental control system according to claim 1, including a second air temperature sensor disposed in the region of the payload and coupled to an input of the processor.

19. An environmental control system according to claim 1, including a third air temperature sensor co-located with the air moisture sensor and coupled to an input of the processor.

* * * * *